(12) United States Patent
Bakker

(10) Patent No.: US 7,931,230 B2
(45) Date of Patent: Apr. 26, 2011

(54) PERSONAL LAND AND AIR VEHICLE

(75) Inventor: Jan Willem Dan Bakker, 's-Gravenmoer (NL)

(73) Assignee: Pal-V Europe NV (NL)

( * ) Notice: Subject to any disclaimer, the term of this patent is extended or adjusted under 35 U.S.C. 154(b) by 908 days.

(21) Appl. No.: 11/576,727

(22) PCT Filed: Oct. 11, 2005

(86) PCT No.: PCT/NL2005/000735
§ 371 (c)(1), (2), (4) Date: May 30, 2007

(87) PCT Pub. No.: WO2006/041287
PCT Pub. Date: Apr. 20, 2006

(65) Prior Publication Data
US 2008/0067284 A1    Mar. 20, 2008

(30) Foreign Application Priority Data
Oct. 12, 2004 (NL) .................................. 1027222

(51) Int. Cl.
*B64C 37/02*    (2006.01)
(52) U.S. Cl. .... 244/2; 244/17.11; 244/17.19; 244/17.27
(58) Field of Classification Search ........... 244/2, 17.11, 244/17.19, 17.27, 17.13
See application file for complete search history.

(56) References Cited

U.S. PATENT DOCUMENTS

| | | | |
|---|---|---|---|
| 2,110,563 A | 3/1938 | Thaon | |
| 2,573,271 A * | 10/1951 | Perl | 244/2 |
| 2,609,167 A * | 9/1952 | Gero, Jr. | 244/49 |
| 2,940,688 A * | 6/1960 | Bland | 244/2 |
| 3,771,923 A | 11/1973 | DeMontaigu et al. | |
| 4,165,856 A * | 8/1979 | Wiseheart | 248/449 |
| 4,653,705 A * | 3/1987 | Bensen | 244/17.11 |

(Continued)

FOREIGN PATENT DOCUMENTS

DE    4119810    12/1992

(Continued)

OTHER PUBLICATIONS

"Gyrocopter Dutch Seek Funds to Spark Flying Motorcycle" Flight International, Reed Business Information, Sutton Surrey, GB, vol. 166, No. 4959, Nov. 9, 2004.

(Continued)

*Primary Examiner* — Christopher P Ellis
(74) *Attorney, Agent, or Firm* — Ryan A. Schneider, Esq.; Troutman Sanders LLP

(57) ABSTRACT

A vehicle (1) for riding on land and flying in air comprises: a cabin (2) with wheels (3, 4), the cabin (2) being designed for accommodating at least one person, a rotor (40) having a rotor axle (41), a rotor base (44) and rotor blades (45) mounted to the rotor base (44); a support bracket (30) carrying the rotor (40), the support bracket (30) having a bottom section (31) extending substantially parallel to the cabin roof, and having at least one leg section (32) extending substantially parallel to the cabin side, the leg section (32) having a free end connected to the cabin (2); wherein the rotor blades (45) are hingedly mounted to the rotor base (44); and wherein the bottom bracket (31) part with the rotor (40) is displaceable in the longitudinal direction of the vehicle (1).

42 Claims, 7 Drawing Sheets

U.S. PATENT DOCUMENTS

| | | | | |
|---|---|---|---|---|
| 4,813,624 A | * | 3/1989 | Williams | 241/282.2 |
| 5,050,817 A | * | 9/1991 | Miller | 244/2 |
| 5,098,033 A | * | 3/1992 | Haseloh et al. | 244/8 |
| 5,203,520 A | * | 4/1993 | Przygodzki et al. | 244/2 |
| 5,301,900 A | * | 4/1994 | Groen et al. | 244/17.25 |
| 5,544,844 A | * | 8/1996 | Groen et al. | 244/8 |
| 5,915,649 A | | 6/1999 | Head | |
| 5,927,424 A | | 7/1999 | Van Den Brink et al. | |
| 6,450,446 B1 | * | 9/2002 | Holben | 244/34 A |
| 6,978,969 B1 | * | 12/2005 | Neal | 244/23 B |
| 7,137,591 B2 | * | 11/2006 | Carter et al. | 244/17.27 |
| 7,178,757 B1 | * | 2/2007 | Breese et al. | 244/8 |
| 2005/0051667 A1 | * | 3/2005 | Arlton et al. | 244/17.11 |

FOREIGN PATENT DOCUMENTS

DE  10159082  12/2003

OTHER PUBLICATIONS

International Searhc Report for PCT Application No. PCT/NL2005/000735 dated Jan. 30, 2006.

* cited by examiner

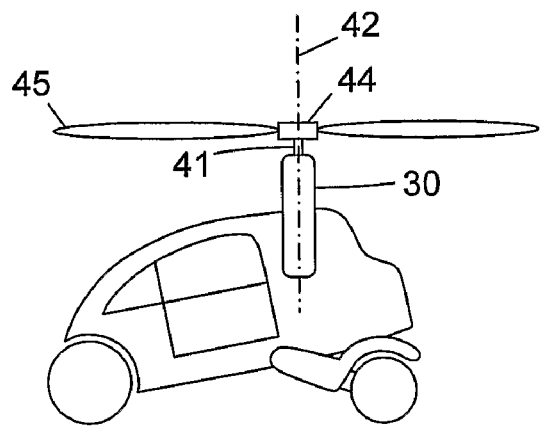
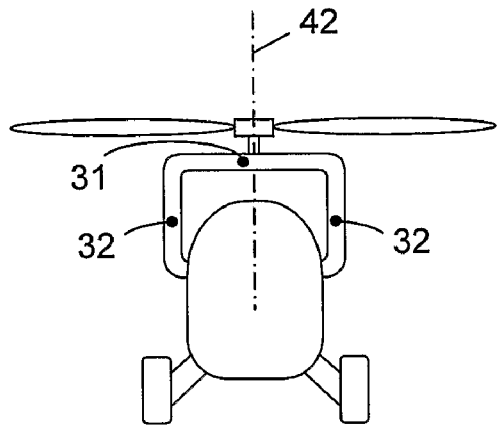
FIG. 5A          FIG. 5B
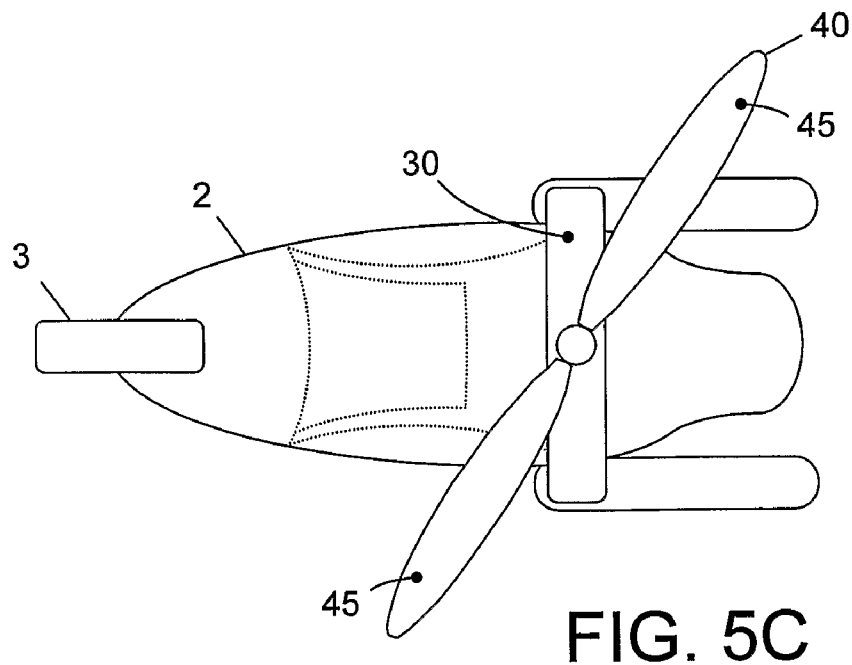
FIG. 5C

PERSONAL LAND AND AIR VEHICLE

CROSS-REFERENCES TO RELATED APPLICATIONS

This application is a U.S. National Stage of International Application No. PCT/NL2005/000735, filed 11 Oct. 2005, which claims the benefit of NL 1027222, filed 12 Oct. 2004.

FIELD OF THE INVENTION

The present invention relates in general to a vehicle capable of riding on land and flying in air.

BACKGROUND OF THE INVENTION

A vehicle of the above type is described in German Offenlegungsschrift 101.59.082. An important disadvantage of this known vehicle is the fact that has fixed wings which must be attached before flying, and must be detached after flying in order to be capable of road traffic. The same applies to the propeller. The wings and the propeller must be left at the airport, and the vehicle must return to this airport for the next flight. This makes the transition from land-vehicle to air-vehicle and back a complicated operation, which is not attractive to the user.

An important objective of the present invention is to provide a vehicle of the above type which has an improved usefulness, especially less complicated transition from land-vehicle to air-vehicle and back. Specifically, the present invention aims to provide a vehicle which is actually suitable for comfortable road traffic with a suitable speed, and which can easily be converted into an air-vehicle, for take-off and landing at virtually any location.

SUMMARY OF THE INVENTION

According to an important aspect of the present invention, a vehicle comprises a rotor with foldable rotor blades, although detachable rotor blades are envisaged as an alternative. The rotor is mounted on a rotor support which is capable of a displacement in the longitudinal direction of the vehicle. In flying mode, the rotor blades are extended, and the centre of the rotor is located substantially above the mass centre of the vehicle. In riding mode, the rotor blades are folded such that they extend substantially parallel to the longitudinal direction if the vehicle, while the centre of the rotor is displaced towards the front end or rear end of the vehicle.

BRIEF DESCRIPTION OF THE DRAWINGS

These and other aspects, features and advantages of the present invention will be further explained by the following description with reference to the drawings, in which same reference numerals indicate same or similar parts, and in which:

FIGS. 5A, 5B and 5C are schematic side, rear and top views, respectively, of the vehicle, illustrating the rotor in flight condition;

DETAILED DESCRIPTION OF THE INVENTION

Figure 1:
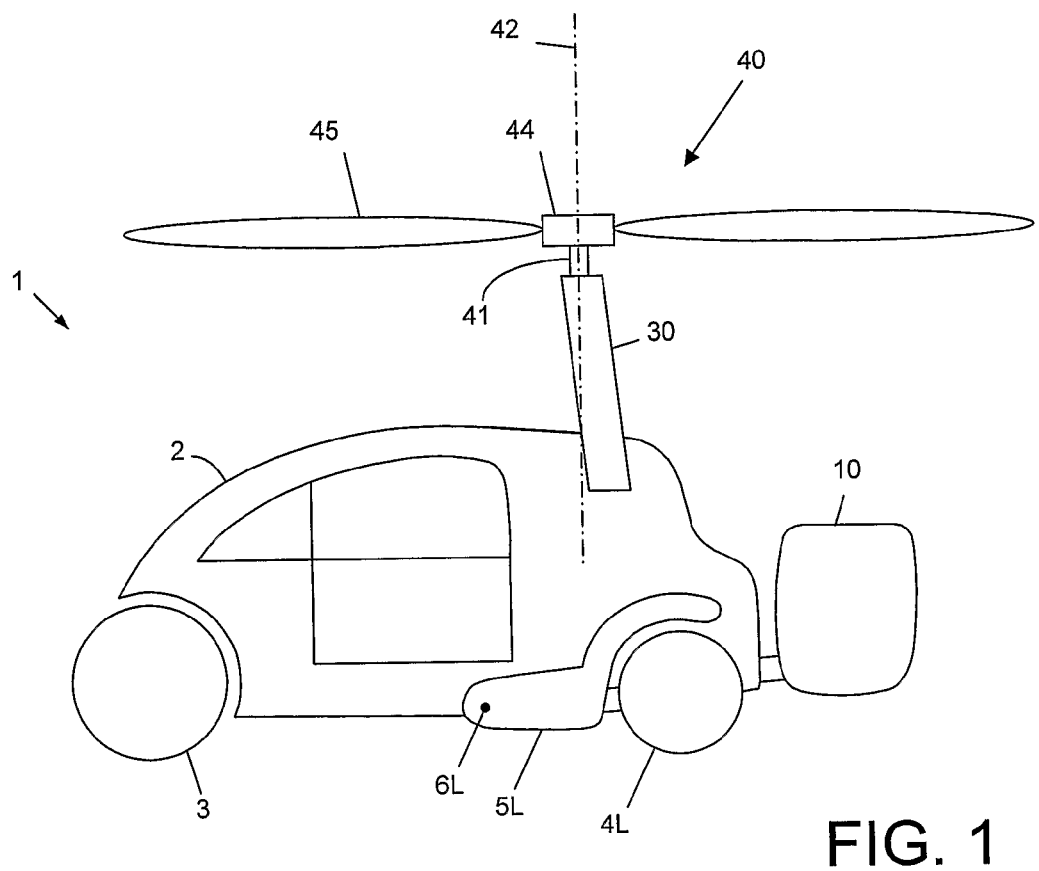
FIG. 1 schematically shows a side view of a personal land and air vehicle in accordance with the present invention.

FIG. 1 schematically shows a side view of a vehicle 1 in accordance with the present invention. The vehicle 1 comprises a cabin 2, front wheel 3, and two rear wheels 4L and 4R, only one rear wheel 4L being visible in FIG. 1. The rear wheels 4 are driven by a motor (not shown), which may be any suitable conventional motor. The cabin 2 accommodates a seat for a driver, steering wheel or the like, control equipment, etcetera, all of which is not shown for sake of simplicity. Although not essential, it is preferred that the vehicle 1 has one front wheel 3, located at the longitudinal centre line of the vehicle. Alternatively, the vehicle 1 may for instance have two front wheels located close together. As a result, the frontal width of the vehicle is relatively small, which contributes to an advantageous air resistance coefficient.

For flying purposes, the air resistance coefficient should be as low as possible, therefore the vehicle should have an aerodynamic profile with a small width. In the preferred embodiment, the vehicle has a width for accommodating one person. In order to enhance the transverse stability in riding mode, the cabin 2 is tiltable around a longitudinal axis. The front wheel 3 tilts along with the cabin.

In said German Offenlegungsschrift 101.59.082 to BMW, it is mentioned that the vehicle is tiltable, but the publication does not mention what kind of tilting system is to be used. Tilting systems for vehicles as such are known, wherein the tilting angle is usually based on the steering angle (the angle of the steering wheel with respect to the neutral position). In accordance with a preferred embodiment of the present invention, an active tilting system is used, wherein the tilting angle of the vehicle is controlled in relationship to forces acting on the front wheel. Thus, when riding in a curve, the tilting angle can depend on the speed. On the other hand, when riding in slippery conditions, in the case of full steering angle, the tilting angle may be small or even remain zero. Such active tilting system is known per se; by way of example, reference is made to U.S. Pat. No. 5,927,424 to Brinks Westmaas BV. Therefore, a more detailed description of such active steering system is not necessary here.

Figures 2A, 2B:
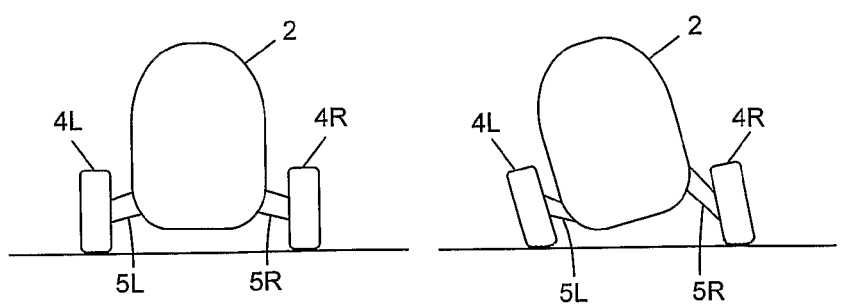
FIGS. 2A-B are schematic rear views of the vehicle, illustrating the behaviour of the rear wheels in a curve.

In the active tilting system of said U.S. Pat. No. 5,927,424, the vehicle comprises a tilting cabin unit and a stationary unit which comprises a frame, the drive motor and the rear wheels; the cabin unit tilts with respect to the stationary unit. In the vehicle of the present invention, there is no such stationary unit: the motor is fixed with respect to the cabin, and tilts along with the cabin. Also the rear wheels 4 tilt along with the cabin 2, with the understanding that, although the attitude of the rear wheels 4 tilts, the mutual positional relationship of the rear wheels with respect to the road remains the same. More particularly, the centre points of the rear wheels 4 remain substantially in a horizontal plane (assuming a horizontal road). This is illustrated in FIGS. 2A and 2B, which are schematic rear views of the vehicle 1 in a condition for straight travel (not tilted, FIG. 2A) and a condition for taking a curve (tilted, FIG. 2B). To this end, the wheels are mounted to the cabin such as to be oppositely displaceable in the vertical direction with respect to the cabin: if one wheel is lifted, the other wheel is lowered over the same distance, and vice versa. The vehicle comprises a mechanism for actively setting the vertical position of the rear wheels with respect to the cabin. This mechanism comprises a power sensor measuring the load of the front wheel, and a wheel position actuator controlled by the output signal of said power sensor. In a preferred embodiment as illustrated, the wheels 4 are mounted on respective arms 5, each arm 5L, 5R substantially extending in the longitudinal direction of the vehicle, parallel to the side of the cabin 2, carrying the corresponding wheel 4L, 4R at a rear arm end, while the front end 6L, 6R of the arm 5L, 5R is mounted to pivot around a horizontal transverse axis. In the condition for straight travel (not tilted, FIG. 2A), the arms 5L, 5R are at the same level. When the said power sensor senses a force corresponding to a left-hand turn (FIG. 2B), the said actuator rotates the left-hand arm 5L upwards thus lifting the left-hand wheel 4L, while simultaneously the right-hand arm 5R is rotated downwards thus lowering the right-hand wheel 4R; as a consequence, the cabin 2 is tilted. It can be seen in FIG. 2B that the wheels 4L, 4R remain substantially parallel to the sides of the tilted cabin 2.

It should be clear that, for a right-hand turn, the left-hand wheel 4L is lowered while the right-hand wheel 4R is lifted. In flying mode, both wheels are lowered so that the cabin 2 as a whole is lifted, as will be explained in more detail later.

When the vehicle is airborne, it is desirable that it has a tail with at least one upright tail plane with a longitudinal orientation, the tail being at a relatively large distance from the cabin, to enhance the aerodynamic stability with a view to side wind. On the other hand, for road traffic, the longitudinal dimension of the vehicle as a whole should be as small as possible. To solve these conflicting requirements, the vehicle 1 according to the present invention comprises an extendable tail 10, as will be explained in more detail with respect to FIGS. 3A-C.

Figure 3A:
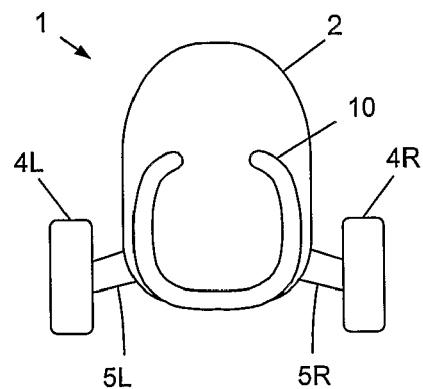
FIGS. 3A-C are schematic rear and top views of the vehicle, illustrating the extendable tail.
Figure 3B:
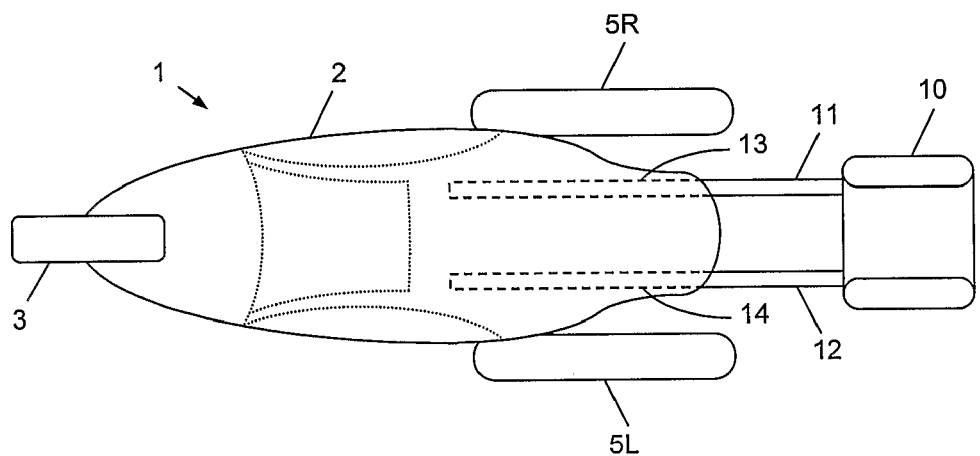
Figure 3C:
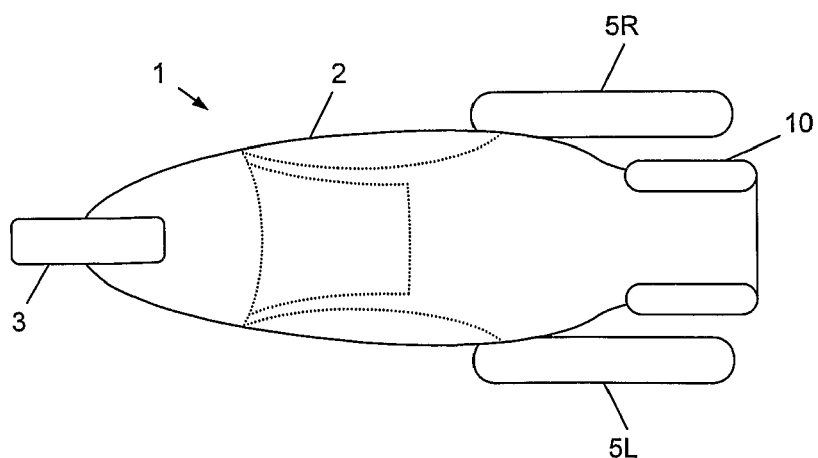

FIG. 3A is a schematic rear view of the vehicle 1, and FIGS. 3B-C are schematic top views of the vehicle 1, the rotor being omitted here for sake of clarity. The aerodynamic shape of the vehicle 1 can clearly be seen from FIGS. 3B-C. Specifically FIG. 3B shows that the cabin 2 has a rear end which is somewhat smaller than a central portion of the cabin. The extendable tail 10 has a general U-shaped profile, as seen from the rear (FIG. 3A), and is mounted on two longitudinal support arms 11, 12 which extend in the longitudinal direction of the vehicle. These support arms 11, 12 are received in guiding tubes 13, 14, respectively, indicated by dotted lines in FIG. 3B, also extending in the longitudinal direction of the vehicle, which in turn are attached to the cabin 2. The support arms 11, 12 are provided with fixing means for strongly fixing the support arms 11, 12 to the corresponding guiding tubes 13, 14; for sake of simplicity, such fixing means, which may be conventional fixing means, are not shown in the drawings. The fixing means are capable of being loosened, so that the support arms 11, 12 can slide in the corresponding guiding tubes 13, 14.

It should be noted that, in alternative embodiments, one single longitudinal support arm with corresponding single guiding tube may suffice, or the vehicle may comprise three or more longitudinal support arms with corresponding single guiding tubes.

FIG. 3B shows the vehicle 1 with the support arms 11, 12 extended from the corresponding guiding tubes 13, 14, so that the tail 10 is at some distance from the rear end of the cabin 2, this distance being determined by the length of the support arms 11, 12. This is a position for flying. For road traffic, the support arms 11, 12 are shifted into the corresponding guiding tubes 13, 14, so that the tail 10 is closer to the cabin 2. In the preferred embodiment as shown, the tail 10 has a contour such that it fits with some play around the rear end of the cabin 2, so that the tail 10 does not extend beyond the cabin 2 (see FIGS. 3A and 3C). This makes it possible to design the cabin 2 with the largest longitudinal dimension as allowed by traffic law (in many cases: 4 m) without being restricted by a projecting tail.

At its rear end, the vehicle 1 is equipped with a propulsion device, capable of generating horizontal thrust at least when airborne, typically also while on land. The propulsion device may for instance comprise a jet engine. In the preferred embodiment as illustrated, the propulsion device comprises a propeller device 20, suitably driven by the drive motor of the vehicle or by a separate motor. The propeller 20 has a substantially horizontal propeller axle 21 and propeller blades 22. For adequate propulsion, it is desirable that the propeller blades 22 have a large length, but for road traffic the length of the propeller blades 22 is limited because it is undesirable or even not allowed that the blades extend beyond the vehicle profile. To meet both demands, the propeller 20 in accordance with the present invention has extendable blades.

Figures 4A, 4B:
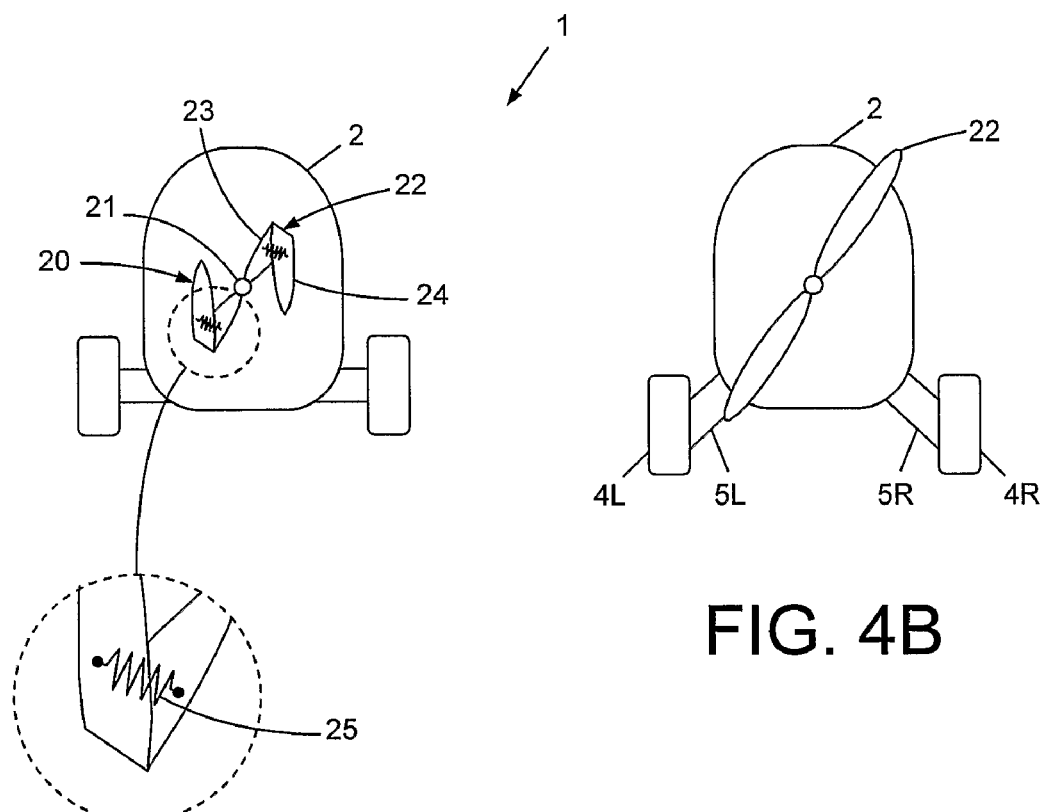
FIGS. 4A-B are schematic rear views of the vehicle, illustrating the extendable blades of the propeller.

In one embodiment, the propeller blades are foldable. FIG. 4A is a schematic rear view of the vehicle 1, showing the propeller 20 in a folded condition; FIG. 4B is a similar view, now showing the propeller 20 in an extended condition. In the embodiment illustrated, the propeller 20 comprises two blades 22, but the propeller 20 may have more blades, as is known per se. Each blade 22 consists of two parts, an inner blade part 23 and an outer blade part 24, hingedly connected to each other. Alternatively, a blade may consist of three or even more parts.

In a riding mode, the propeller 20 is not driven, and the outer blade part 24 is hinged back over the inner blade part 23, so that the overall diameter of the propeller 20 in this condition is limited to substantially the diameter of the inner blade parts 23. FIG. 4A shows this condition, clearly showing that the blades do not project outside the cabin contour. The blade parts 23, 24 are held in this condition by a holding member schematically indicated at 25.

In a flying mode, the propeller 20 is driven, and the outer blade part 24 is hinged to a position such that it is aligned with the inner blade part 23. In a possible embodiment, hinging the blade parts and fixing the blade parts 7in the folded position (FIG. 4A) or the extended position (FIG. 4B), respectively, may be a manual operation. Preferably, however, this is done automatically. To this end, the holding member 25 preferably is a resilient member, for instance a spring, which holds the corresponding blade parts when the propeller is stationary. When the propeller rotates, the outer blade part 24 experiences a centrifugal force, urging it to take a position further away from the rotation axis, against the biasing force of the resilient member 25. When the propeller is stopped, the biasing force of the resilient member 25 returns the propeller blades back to their folded condition.

It is noted that a propeller device with foldable blades is known per se. For instance, reference is made to German Offenlegungsschrift 41.19.810 to Stemme, which describes such propeller for use in a motorized glider. Since commercially available propeller devices can be used in the present invention, while further the present invention does not aim at improving such propeller device, it is not necessay here to describe the propeller device in more detail.

In an alternative embodiment, not illustrated, each propeller blade may comprise two (or more) blade parts sliding lengthwise, for instance in a telescopic manner, with respect to each other. Again, adjusting the length of the propeller blades may be done manually, but each propeller blade is preferably provided with a resilient holding and biasing member urging the outer blade part towards the propeller axis.

It is noted that FIG. 4B also shows that both rear wheels 4L, 4R are lowered in the flying mode. This brings the cabin 2, together with the propeller 20, to a higher level with respect to the ground. A larger distance between the rotating propeller and the ground is preferred, but not essential.

The vehicle 1 is further equipped with a rotor 40 having a rotor base 44 and foldable rotor blades 45 hingedly mounted to the rotor base 44. In the embodiment illustrated, the rotor 40 has two blades 45, but the rotor may have three or more blades. The rotor 40 is mounted on an adjustable support bracket 30; more specifically, the rotor 40 has a rotor axle 41, mounted for rotation in the bottom section 31 of the support bracket 30. The rotation axis of the rotor is indicated at 42.

The support bracket 30 has a substantially inverted U-shape, with a bottom section 31 extending substantially parallel to the cabin roof, and two leg sections 32 extending substantially parallel to the cabin sides. In an alternative embodiment, the bracket 30 may have just one leg section, so that its general shape resembles the Greek letter F.

The free end of the leg sections 32 are mounted to the cabin 2, in such a way that the bottom bracket part 31 with the rotor 40 can be shifted in the longitudinal direction of the vehicle. In a possible embodiment, the bracket 30 can be shifted as a whole, but in the preferred embodiment, the free end of the leg sections 32 are mounted for rotation about a horizontal transverse axis. Preferably, the bracket legs 32 comprise a parallelepiped mechanism, designed to allow the rotation movement of the bracket 30 while assuring that the rotor axis 42 remains substantially vertical.

The rotor is implemented as an auto-gyro: it rotates thanks to the air speed of the vehicle. Before take-off, the rotor is driven by a hydraulic drive, also indicated as pre-rotator, which is known per se. The hydraulics for this drive can be incorporated in the bracket 30.

FIGS. 5A, 5B and 5C are schematic side, rear and top views, respectively, of the vehicle 1 with the rotor 40 in flight condition, the tail 10 and the propeller 20 being omitted for sake of convenience. The support bracket 30 is positioned upright, so that the rotor axis 42 substantially intersects the gravitational centre (mass centre point) of the vehicle. The rotor blades 45 are in their unfolded condition; it can be seen that they extend beyond the contour of the vehicle 1.

It is noted that, although the upright position of the support bracket 30 may be a fixed position, the bracket 30 preferably is provided with a position control mechanism actively controlling (fine tuning) the position of the support bracket 30. Thus, it is possible to adapt the position of the support bracket 30 to different weight distributions, movements of the pilot, etc, such as to maintain the rotor axis 42 intersecting the gravitational centre (mass centre point) of the vehicle.

Figure 6A:
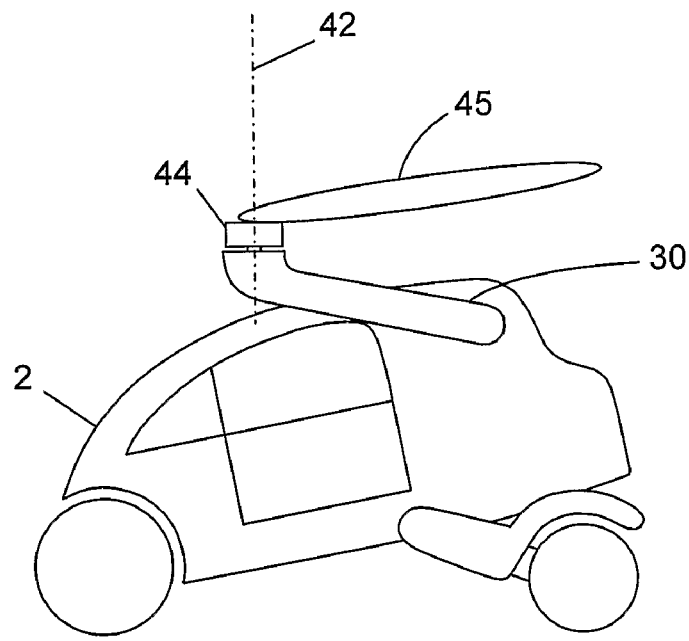
FIGS. 6A-B are schematic side and top views of the vehicle, illustrating the rotor in riding condition.
Figure 6B:
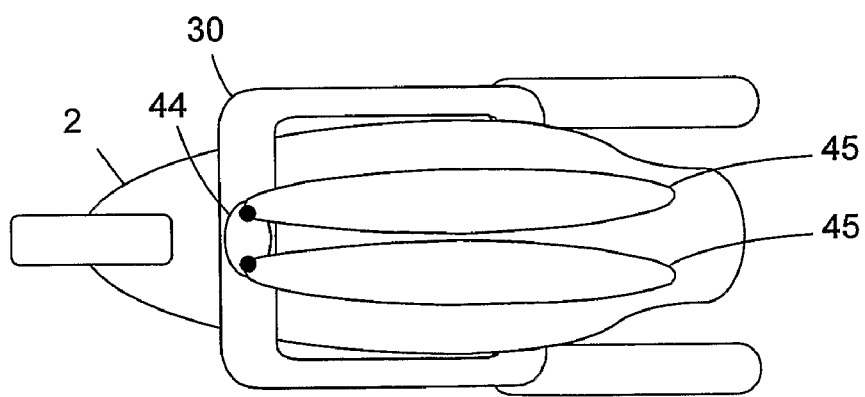

FIGS. 6A and 6B are schematic side and top views, respectively, of the vehicle 1 with the rotor 40 in the condition for road traffic. Again, the tail 10 and the propeller 20 are omitted for sake of convenience. The support bracket 30 is pivoted towards the front end of the vehicle, such that the legs 32 of the bracket 30 are almost horizontal. The rotor blades 45 are pivoted with respect to the rotor base 44, such that they extend substantially parallel to each other in the longitudinal direction of the vehicle, substantially parallel to the roof of the cabin, pointing backwards from the rotor base 44. In this condition, the rotor blades lie within the contour of the vehicle.

Alternatively, it is possible that the bracket pivots towards the rear end of the vehicle, and that the rotor blades point forwards from the rotor base 44.

Figure 6C:
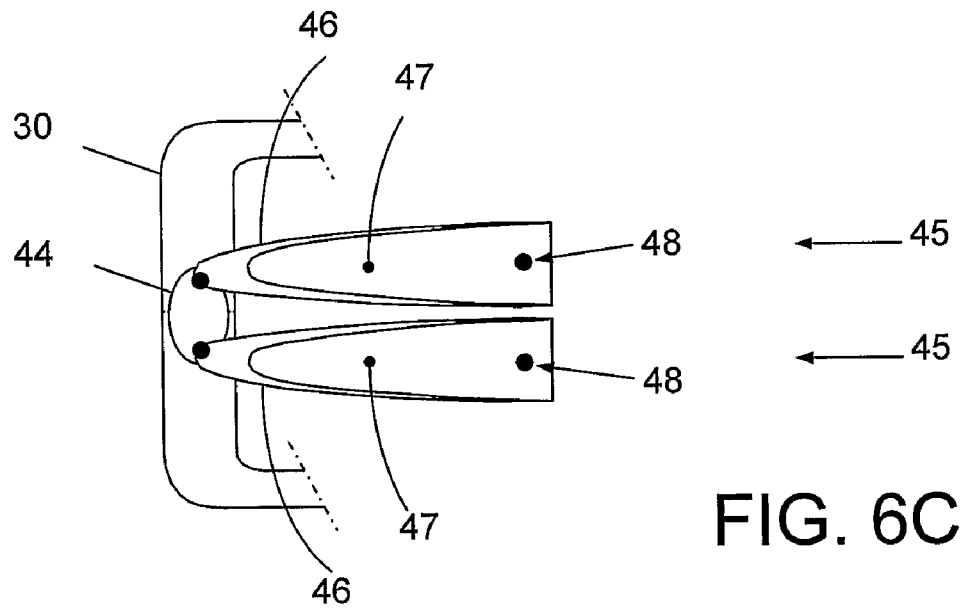
FIGS. 6C-D are schematic top views of part of the vehicle, illustrating extendable rotor blades.

In order to stay within the contour of the vehicle, the maximum length of the rotor blades in their riding mode condition corresponds substantially to the length of the vehicle. Yet, for flying purposes, increased lift is desirable, which involves increased diameter of the rotor. To meet both demands, each rotor blade 45 is preferably extendable as well. In a possible embodiment, each rotor blade 45 comprises two blade sections 46, 47, hingedly connected to each other, so that, in the riding condition, an inner blade section 46 points away from the rotor base 44 to a joint 48 with the corresponding outer blade section 47, while the outer blade section 47 is pivoted with respect to the inner blade section 46 and points from this joint 48 towards the rotor base 44 again. Such configuration is illustrated in FIG. 6C, which only illustrates the rotor base 44 and the two-part blades 45 together with the bracket 30.

Figure 6D:
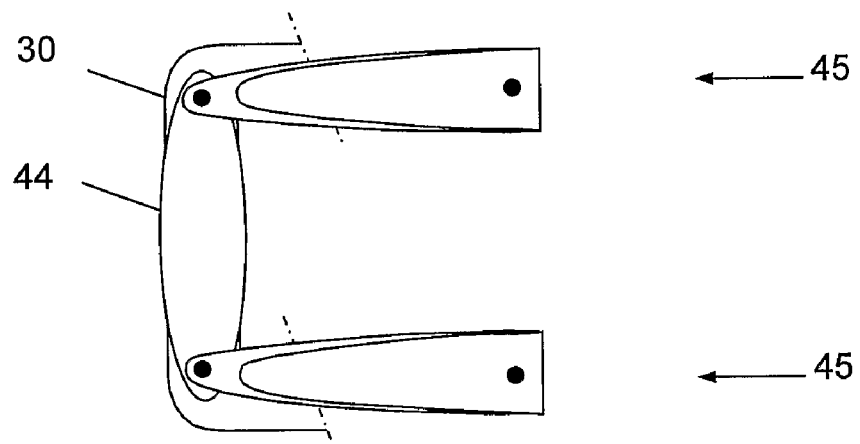

An increase in rotor diameter can also be obtained by increasing the horizontal dimension of the rotor base 44, such that the coupling points 49 of the blades 45 are located further apart, such as schematically illustrated in FIG. 6D, which also only illustrates the rotor base 44 and the two-part blades 45 together with the bracket 30.

Figure 7:
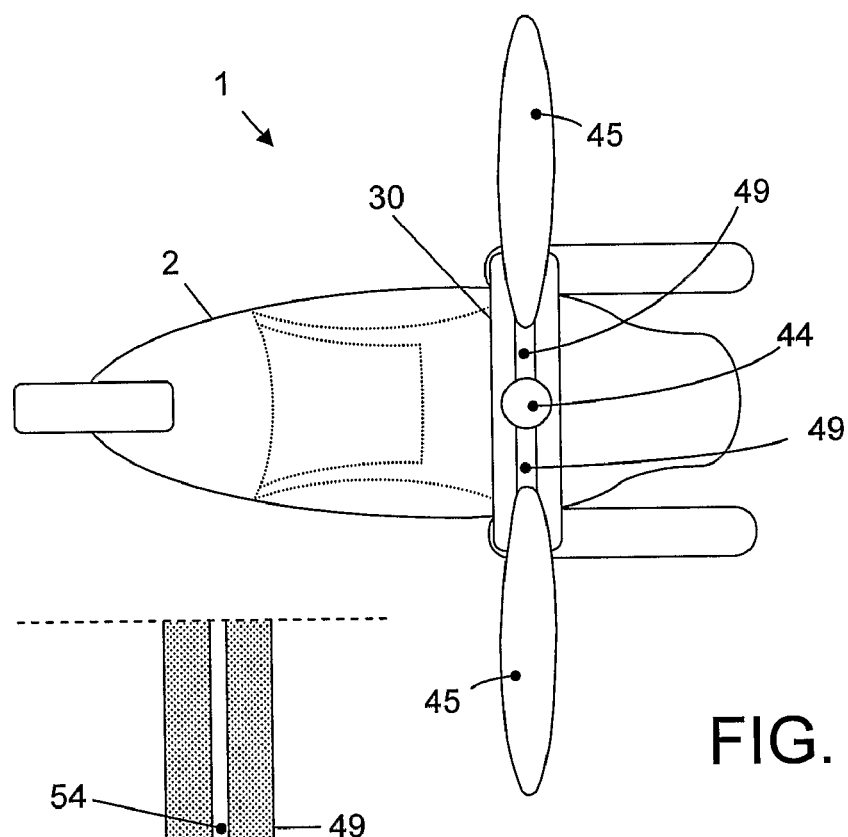
FIG. 7 is a schematic top view of the vehicle, illustrating an alternative embodiment of extendable rotor blades.
Figure 8:
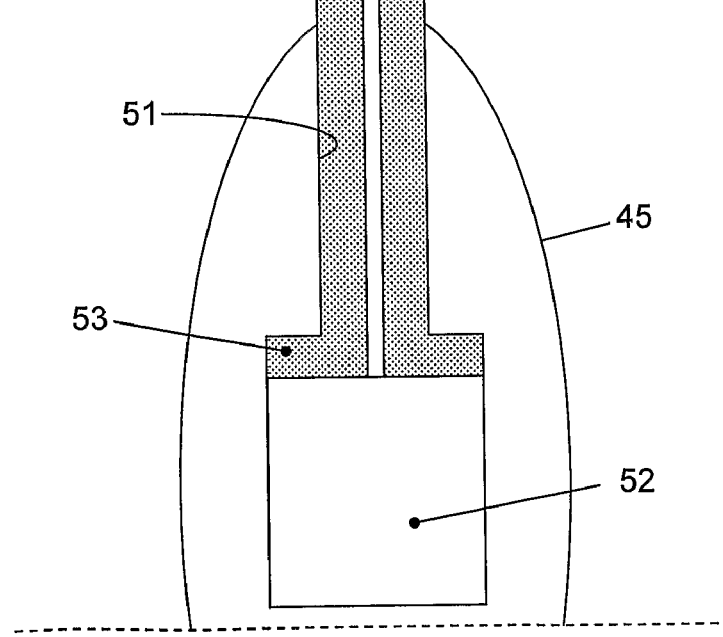
FIG. 8 illustrates a preferred detail of the extendable rotor blades.

It is also possible that a rotor blade 45 can be shifted along its own longitudinal direction, along a coupling bar 49. This possibility is illustrated in FIG. 7, which is a top view comparable to FIG. 5C. A coupling bar 49 extends from the rotor base 44. A rotor blade 45 can be shifted along the coupling bar 49, away from or towards the rotor base 44. A biasing means (for instance a spring, not shown) exerts a biasing force on the rotor blade 45, urging it towards the rotor base 44. In the flying mode, when the rotor rotates, the centrifugal force overcomes the biasing force, and the blade 45 is shifted to its distal position. In that case, the inner portion of the rotor 40, with a radius corresponding to the exposed coupling bar 49, does not contribute to the lifting force, but this is more than compensated by the outer portion of the rotor 40, which describes a larger area,. When the rotor is stationary, the blade 45 is shifted back towards the rotor base 44 under the influence of the biasing force of said biasing means. The coupling bar 49 may then, in fact, be invisible (see FIGS. 6A-D). In the riding mode, the blade 45 is pivoted together with the coupling bar 49 to extend in the longitudinal direction of the vehicle, as described earlier.

Alternatively, sliding the rotor blades and fixing them in position may be done manually, but the embodiment as described has the important advantage that the rotor blades are automatically positioned together, so that a risk of a positional error can be avoided.

In a further preferred embodiment, a rotor blade 45 comprises a hollow cylindrical passage 51 extending to a chamber 52, and the coupling bar 49 has a piston head 53 at its end, fitting in the chamber 52. The chamber 52 has an axial dimension larger than the axial dimension of the piston head 53, the difference determining the length of the possible extension of the rotor blade. The coupling bar 49 comprises hydraulics lines 54, for instance as a longitudinal bore, communicating with the chamber 52. In the riding condition, the piston head is pushed into the chamber as far as possible. For extending the rotor blade for the flying condition, hydraulic fluid is pumped into said chamber 52, pushing the bar 49 outwards as far as possible. This also provides a mechanism for holding the blade in its extended condition by maintaining the fluid pressure of the hydraulic fluid.

In the following, a journey from a start location to a target location will be described.

The driver may park the vehicle close to home, in a garage, etc. When travelling to a distant location, he will start his journey by riding away from his home, taking part in normal traffic, until he reaches a location which is suitable for take-off. Such location may be a small airfield, but it may also be a suitable parking place along a highway or the like.

The driver stops the vehicle, and switches off the motor. He unfolds the rotor blades, and fixes the blades in their folded position. Depending on design, he may manually extend the rotor blades, and fix the blades in their extended position. He brings the bracket 30 to its upright position, extends the tail, and, if desired, switches the rear wheels to their lower position. He then starts the propeller; automatically, caused by centrifugal force, the propeller blades are extended.

Finally, the driver (now pilot) starts the prerotator to give the rotor rotational speed; the vehicle is now ready for take-off.

Once airborne, the vehicle can fly towards the destination without being hindered by traffic jams. When sufficiently close to his destination, the pilot lands the vehicle at a location which is both suitable for landing and suitably connected to the road network. He stops the propeller; automatically, the blades return to their folded position. The tail is pushed back, the wheels may be lifted to their normal position, the rotor blades are folded, and the bracket is brought to its horizontal position. The vehicle is then ready for riding in normal traffic, towards the actual destination of the driver.

It should be clear to a person skilled in the art that the present invention is not limited to the exemplary embodiments discussed above, but that several variations and modifications are possible within the protective scope of the invention as defined in the appending claims.

For instance, it is possible that rotor blades 45 are detached from the rotor base and stored in a longitudinal compartment, preferably at the bottom side of the vehicle. The same applies to the propeller blades.

In the above, a propeller is described as propulsion device. As an alternative, the vehicle may be provided with another type of propulsion device, for instance a jet engine.

The invention claimed is:

1. Vehicle for riding on land and flying in air, the vehicle comprising:
    a cabin with wheels, the cabin being designed for accommodating at least one person, at least one of the wheels being driven by a motor;
    a rotor having a rotor axle, a rotor base and rotor blades mounted to the rotor base;
    a support bracket carrying the rotor, the support bracket having a bottom section extending substantially parallel to the cabin roof, and having at least one leg section extending substantially parallel to the cabin side, the leg section having a free end connected to the cabin;
    wherein the rotor blades are hingedly mounted to the rotor base;
    and wherein the bottom bracket part with the rotor is displaceable in the longitudinal direction of the vehicle.

2. Vehicle according to claim 1, wherein the free end of the leg section is mounted for rotation about a horizontal transverse axis.

3. Vehicle according to claim 2, wherein the bracket leg comprises a parallelepiped mechanism for assuring that the rotor axis remains substantially vertical.

4. Vehicle according to claim 1, wherein the rotor is implemented as an auto-gyro.

5. Vehicle according to claim 4, wherein the rotor is provided with a hydraulically driven pre-rotator, wherein the hydraulics for this pre-rotator are incorporated in the bracket.

6. Vehicle according to claim 1, having a condition for road traffic in which the support bracket is displaced towards an end of the vehicle, and in which the rotor blades are pivoted with respect to the rotor base to a position such that they extend substantially parallel to each other in the longitudinal direction of the vehicle.

7. Vehicle according to claim 6, wherein, in the condition for road traffic, the support bracket is pivoted towards an end of the vehicle such that the bracket leg is almost horizontal.

8. Vehicle according to claim 1, having a condition for air traffic in which the support bracket is held in such position, preferably an upright position, that the rotor axis substantially intersects the centre of gravity (mass centre point) of the vehicle.

9. Vehicle according to claim 8, provided with a position control mechanism controlling the position of the support bracket such as to adapt the position of the rotor axis to changes in weight distribution, such that the rotor axis remains intersecting the centre of gravity (mass centre point) of the vehicle.

10. Vehicle according to claim 1, further comprising an extendable tail.

11. Vehicle according to claim 10, wherein the extendable tail has a general U-shaped profile, as seen from the rear.

12. Vehicle according to claim 10, wherein the extendable tail is mounted on at least one longitudinal support arm extending in the longitudinal direction of the vehicle, the support arm being slidably received in guiding tube attached to the cabin and extending in the longitudinal direction of the vehicle.

13. Vehicle according to claim 10, wherein, in a condition for road traffic, the extendable tail at least partly fits around the rear end of the cabin.

14. Vehicle according to claim 1, further comprising, at its rear end, a propulsion means.

15. Vehicle according to claim 14, wherein the propulsion means comprises a propeller means having a substantially horizontal propeller axle and propeller blades.

16. Vehicle according to claim 15, wherein the propeller has extendable blades.

17. Vehicle according to claim 16, wherein the propeller blades are foldable.

18. Vehicle according to claim 17, wherein each propeller blade comprises an inner blade part and an outer blade part, hingedly connected to each other.

19. Vehicle according to claim 18, wherein, in the condition for road traffic, the outer blade part is hinged back over the inner blade part towards the propeller axis, whereas in the condition for air traffic, the outer blade part is hinged outwards.

20. Vehicle according to claim 17, wherein each propeller blade comprises an inner blade part and an outer blade part sliding lengthwise, for instance in a telescopic manner, with respect to each other.

21. Vehicle according to claim 20, wherein, in a condition for road traffic, the outer blade part is slid inwards towards the propeller axis, whereas in the condition for air traffic, the outer blade part is slid outwards.

22. Vehicle according to claim 18, wherein each propeller blade is provided with a resilient holding and biasing member urging the outer blade part towards the propeller axis.

23. Vehicle according to claim 16, wherein the propeller blades are designed to automatically take their extended condition under the influence of centrifugal force in the case of a rotating propeller.

24. Vehicle according to claim 1, wherein the cabin is actively tiltable around a longitudinal axis.

25. Vehicle according to claim 24, comprising one front wheel or a set of front wheels located close to each other, located at the longitudinal centre line of the vehicle, arranged to be tilted along with the cabin.

26. Vehicle according to claim 24, comprising two rear wheels arranged to be actively lifted or lowered with respect to the cabin, in opposite directions with respect to each other.

27. Vehicle according to claim 26, comprising a wheel position actuator designed, in a riding mode, for lifting an inner rear wheel with respect to the cabin while simultaneously lowering the opposite outer rear wheel with respect to the cabin.

28. Vehicle according to claim 27, wherein the wheel position actuator is controlled on the basis of a force sensor sensing a road reaction force acting on the front wheel.

29. Vehicle according to claim 26, wherein, in flying mode, both rear wheels are lowered with respect to the cabin.

30. Vehicle according to claim 26, wherein each rear wheel is mounted on a respective arm substantially extending in the longitudinal direction of the vehicle, parallel to the side of the cabin, carrying the corresponding wheel at a rear arm end, while the front end of the arm is mounted to the cabin such as to pivot around a horizontal transverse axis.

31. Vehicle for riding on land and flying in air, the vehicle comprising:
a cabin with wheels, the cabin being designed for accommodating at least one person, at least one of the wheels being driven by a motor;
a rotor having a rotor axle, a rotor base and rotor blades mounted to the rotor base;
a support bracket carrying the rotor, the support bracket having a bottom section extending substantially parallel to the cabin roof, and having at least one leg section extending substantially parallel to the cabin side, the leg section having a free end connected to the cabin;
wherein the rotor blades are hingedly mounted to the rotor base;
wherein the rotor blades are extendable blades;
and wherein the bottom bracket part with the rotor is displaceable in the longitudinal direction of the vehicle.

32. Vehicle according to claim 1, wherein the rotor is implemented as an auto-gyro.

33. Vehicle according to claim 1, further comprising an extendable tail.

34. Vehicle according to claim 1, further comprising, at its rear end, a propulsion means.

35. Vehicle according to claim 1, wherein the cabin is actively tiltable around a longitudinal axis.

36. Vehicle according to claim 31, wherein the rotor is implemented as an auto-gyro.

37. Vehicle according to claim 31, further comprising an extendable tail.

38. Vehicle according to claim 31, further comprising, at its rear end, a propulsion means.

39. Vehicle according to claim 31, wherein the cabin is actively tiltable around a longitudinal axis.

40. Vehicle for riding on land and flying in air, comprising:
a cabin with wheels, the cabin being designed for accommodating at least one person;
a rotor having a rotor axle, a rotor base and rotor blades mounted to the rotor base;
wherein the rotor blades are hingedly mounted to the rotor base;
wherein the rotor blades are extendable blades;
wherein each rotor blade is provided with a coupling member attached to the rotor base, the rotor blade being capable of shifting along said coupling member in a longitudinal direction;
and wherein a rotor blade comprises a hollow passage extending to a chamber, and wherein said coupling member comprises a support bar extending into said hollow cylindrical passage and having a piston head fitting in said chamber;
the rotor blade further being provided with hydraulics for adapting the setting of the rotor blade.

41. Vehicle for riding on land and flying in air, the vehicle comprising:
a cabin with wheels, the cabin being designed for accommodating at least one person, at least some of the wheels being driven by a motor;
a rotor having a rotor axle, a rotor base and rotor blades mounted to the rotor base;
a support bracket carrying the rotor, the support bracket having a bottom section extending substantially parallel to the cabin roof, and having at least one leg section extending substantially parallel to the cabin side, the leg section having a free end connected to the cabin;
wherein the rotor blades are hingedly mounted to the rotor base;
and wherein the bottom bracket part with the rotor is displaceable in the longitudinal direction of the vehicle;
the vehicle having a condition for road traffic in which the support bracket is displaced towards an end of the vehicle, and in which the rotor blades are pivoted with respect to the rotor base to a position such that they extend substantially parallel to each other in the longitudinal direction of the vehicle.

42. Vehicle for riding on land and flying in air, the vehicle comprising:
a cabin with wheels, the cabin being designed for accommodating at least one person, at least some of the wheels being driven by a motor;
a rotor having a rotor axle, a rotor base and rotor blades mounted to the rotor base;
a support bracket carrying the rotor, the support bracket having a bottom section extending substantially parallel to the cabin roof, and having at least one leg section extending substantially parallel to the cabin side, the leg section having a free end connected to the cabin;
wherein the rotor blades are hingedly mounted to the rotor base;
and wherein the bottom bracket part with the rotor is displaceable in the longitudinal direction of the vehicle;
the vehicle having a condition for road traffic in which the support bracket is displaced towards an end of the vehicle such that the bracket leg is almost horizontal, and in which the rotor blades are pivoted with respect to the rotor base to a position such that they extend substantially parallel to each other in the longitudinal direction of the vehicle.

* * * * *